(12) United States Patent
Ma

(10) Patent No.: US 9,148,265 B2
(45) Date of Patent: Sep. 29, 2015

(54) DETERMINATION OF FREQUENCY OFFSET

(75) Inventor: Zhangyong Ma, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 299 days.

(21) Appl. No.: 13/645,644

(22) PCT Filed: Apr. 12, 2010

(86) PCT No.: PCT/CN2010/000475
§ 371 (c)(1),
(2), (4) Date: Jan. 2, 2013

(87) PCT Pub. No.: WO2011/127621
PCT Pub. Date: Oct. 20, 2011

(65) Prior Publication Data
US 2014/0036860 A1    Feb. 6, 2014

(51) Int. Cl.
*H04L 5/00* (2006.01)
*H04L 27/26* (2006.01)

(52) U.S. Cl.
CPC .......... *H04L 5/0005* (2013.01); *H04L 27/2657* (2013.01); *H04L 27/2671* (2013.01); *H04L 27/2675* (2013.01); *H04L 27/2636* (2013.01)

(58) Field of Classification Search
CPC . H04L 5/0005; H04L 27/2657; H04L 5/0007; H04L 27/2675
USPC .................. 370/330, 344, 252; 375/260, 344
See application file for complete search history.

(56) References Cited

U.S. PATENT DOCUMENTS

| 7,646,702 | B2 * | 1/2010 | Sudo ............................ 370/208 |
| 7,924,779 | B2 * | 4/2011 | Yeon et al. .................... 370/329 |
| 2007/0147225 | A1 | 6/2007 | Yu et al. |
| 2007/0230591 | A1 * | 10/2007 | Choi et al. .................... 375/260 |

FOREIGN PATENT DOCUMENTS

| CN | 101087158 A | 12/2007 |
| CN | 101309248 A | 11/2008 |
| CN | 101364964 A | 2/2009 |

* cited by examiner

*Primary Examiner* — Jamal Javaid

(57) ABSTRACT

A method in a sending system entity for estimating a frequency offset associated with a data transfer from a receiving system entity in a mobile communication network is disclosed. The method includes extracting user data associated with a predefined user from the transferred data and transforming the extracted user data into a time domain. The method also includes estimating a resource symbol phase offset, $\theta_1$, between two resource symbols representing the same user from the transformed user data and estimating a resource element phase offset, $\theta_2$, between two resource blocks occupied by the same user. Additionally, the method includes estimating a frequency offset based on $\theta_1$ and $\theta_2$.

18 Claims, 4 Drawing Sheets

DETERMINATION OF FREQUENCY OFFSET

TECHNICAL FIELD

The present invention relates generally to optimising communication settings. More specific, the invention relates to determination and compensation for frequency offsets for a data transmission in a wireless communication system.

BACKGROUND ART

In 3GPP ($3^{rd}$ Generation Partnership Project), the packet-switched communication systems HSPA (High Speed Packet Access) and LTE (Long Term Evolution) have been specified for wireless transmission of data packets between user terminals and base stations in a cellular/mobile network. In this description, the term "base station" is used to generally represent any system entity capable of wireless communication with a user terminal. A base station of a cell in a wireless network may transmit data and control information in a physical downlink channel to a user terminal or "UE" (User Equipment), and a user terminal may likewise transmit data and control information in a physical uplink channel in the opposite direction to the base station. In this description, a physical downlink or uplink channel is generally referred to as a wireless link between a sending entity and a receiving entity. Further, the terms "sending entity" and "receiving entity" are used here merely to imply the direction of the wireless link considered, although these entities can of course both receive and send data and messages in an ongoing communication.

LTE systems generally use DFT-SFDMA (Discrete Fourier Transform-Spread Frequency Division Multiple Access) in uplink. The DFT-SFDMA transmission technique, is considered an effective technique in high-bit-rate data due to its spectral efficiently, it robustness in different multipath propagation environment, and its low PAPR (Peak-to-Average-Power-Ratio). However, a well-known problem of DFT-SFDMA is its vulnerability to the frequency offset (FO) including carrier frequency offset (CFO) resulting from the mismatch between the carrier frequencies at the transmitter and receiver. There are numerous estimation methods for CFO correction. Some of them are focused on the estimation accuracy, but the estimation range is then limited. Other methods are instead focused on a wider estimation range, but then the accuracy is not reliable enough. It is very difficult to balance the accuracy and range in the real system. In the invention, according to the frame structure of the LTE uplink, both estimation range and accuracy for CFO correction are considered.

With "resource block" is meant the smallest time unit possible to schedule for a user. Typically, a user occupies one or more resource blocks, as seen in FIG. 1. Each resource block consists of a grid with 14 resource symbols on one axis and 12 resource elements on the other axis.

It is thus generally a problem that in communication in uplink according to DFT-SFDMA based structures, the carrier frequencies for the resource elements are affected by various frequency offsets between the receiving system entities and the sending system entity, which disturbs the communication.

SUMMARY OF INVENTION

It is an object of the invention to address at least some of the problems outlined above. In particular, it is an object of the invention to support wireless communication over a physical channel in a mobile broadband system by estimating a frequency offset between the system entities communicating over the channel. This object and others may be obtained by providing a method and an apparatus according to the independent claims attached below.

According to one aspect, a method in a sending system entity is provided for estimating a Frequency Offset, associated with a data transfer from a receiving system entity in a mobile communication network. In the method is user data associated to a predefined user extracted from the transferred data. The extracted user data is transformed into a time domain. A resource symbol phase offset $\theta_1$ between two resource symbols representing the same user, is estimated from the transformed user data. Furthermore is a resource element phase offset $\theta_2$ between two resource blocks occupied by the same user estimated from the transformed user data. Finally, is a frequency offset estimated based on the resource symbol phase offset $\theta_1$ and the resource element phase offset $\theta_2$.

According to the aspect above, the resource symbols may be reference symbols and the estimation of the resource symbol phase offset $\theta_1$ may performed by calculating the sum of one or more cross-correlations between two reference signals associated to the same resource element. Furthermore, the estimation of the resource element phase offset $\theta_2$ may be performed by calculating the phase offset between two resource blocks occupied by the same user, e.g. by calculating the sum of one or more cross-correlations between two reference signals, the reference signals being associated with corresponding resource elements of the resource blocks. Furthermore, the frequency offset may be a Carrier Frequency Offset, a Doppler Frequency Offset, a Timing Error Frequency Offset, etc.

According to another aspect, a sending system entity is provided which is adapted to estimate a Frequency Offset associated with a data transfer from a receiving system entity in a mobile communication network. The sending system entity comprises a communication unit adapted to receive the data, a user extracting unit adapted to extract the data associated with a predefined user. Furthermore, the sending system entity comprises a transformation unit adapted to transform the extracted data from a frequency domain into a time domain, and a resource symbol phase offset estimator adapted to determine a resource symbol phase offset $\theta_1$ for the data transfer. Moreover, a resource element phase offset estimator adapted to determine a resource element phase offset $\theta_2$ for the data transfer is comprised in the sending system entity. Also a frequency offset estimator is comprised in the sending system entity. The frequency offset estimator is adapted to determine the Frequency Offset based on the resource symbol phase offset $\theta_1$ and the resource symbol phase offset $\theta_2$. The sending system entity may be realised as any of a radio base station, a NodeB, an eNodeB, an access point, or a relay station.

The above methods and arrangements may be used to obtain an accurate estimate of the carrier frequency offset within a reliable range. By estimating and applying a resource symbol phase offset and a resource element phase offset, an accurate estimate of frequency offsets within a relatively large range may be effectively calculated, based on the resource symbol phase offset and the resource element phase offset.

Further features and benefits of the present invention will become apparent from the detailed description.

BRIEF DESCRIPTION OF DRAWINGS

The invention is now described, by way of example, with reference to the accompanying drawings, in which.

DESCRIPTION OF EMBODIMENTS

Briefly described, a solution is provided for enabling more accurate estimates of frequency offsets over a relatively wide range. A sending system entity receiving data from one or more receiving system entities, extracts the data for a predefined user i from the received data. The extracted data is transferred into a time domain before a resource symbol phase offset and a resource element phase offset are estimated. Finally, a carrier frequency offset is estimated, based on the resource symbol offset and the resource element phase offset.

With "Resource symbol phase offset" $\theta_1$ is in this description meant the phase difference between the two resource symbols associated to the same resource element, e.g. the reference symbols 3 and 7 which are reserved for reference signals.

With "Resource element phase offset" $\theta_2$ is in this description meant the phase difference between two corresponding resource symbols associated to different resource blocks, e.g. the reference symbol 3.

Figure 1:
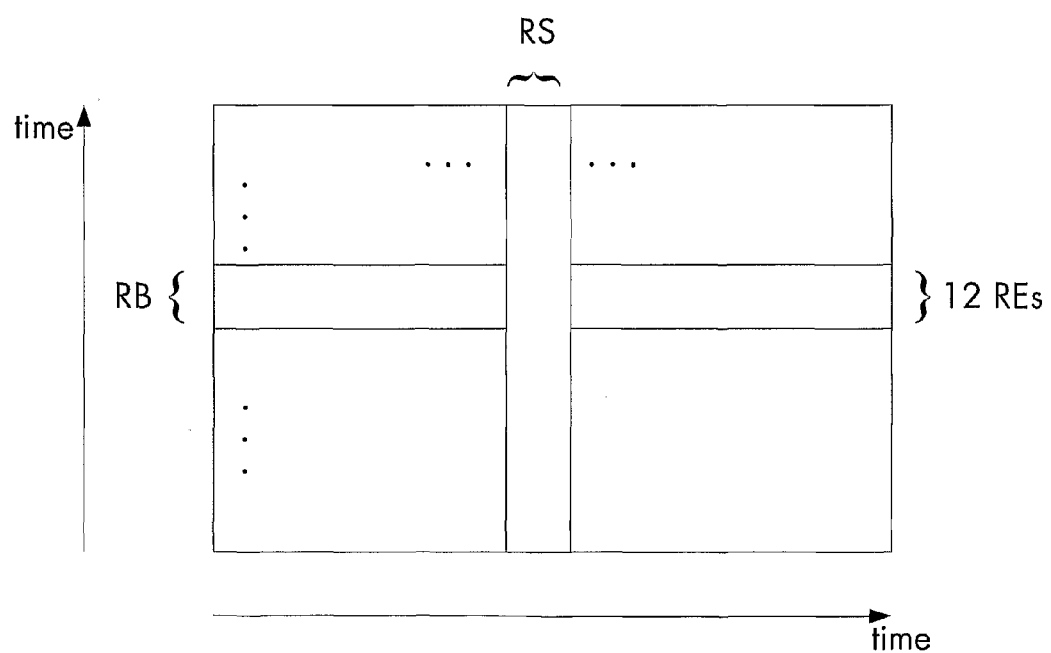
FIG. 1 shows schematically the structure of resource blocks according to prior art.
Figure 2:
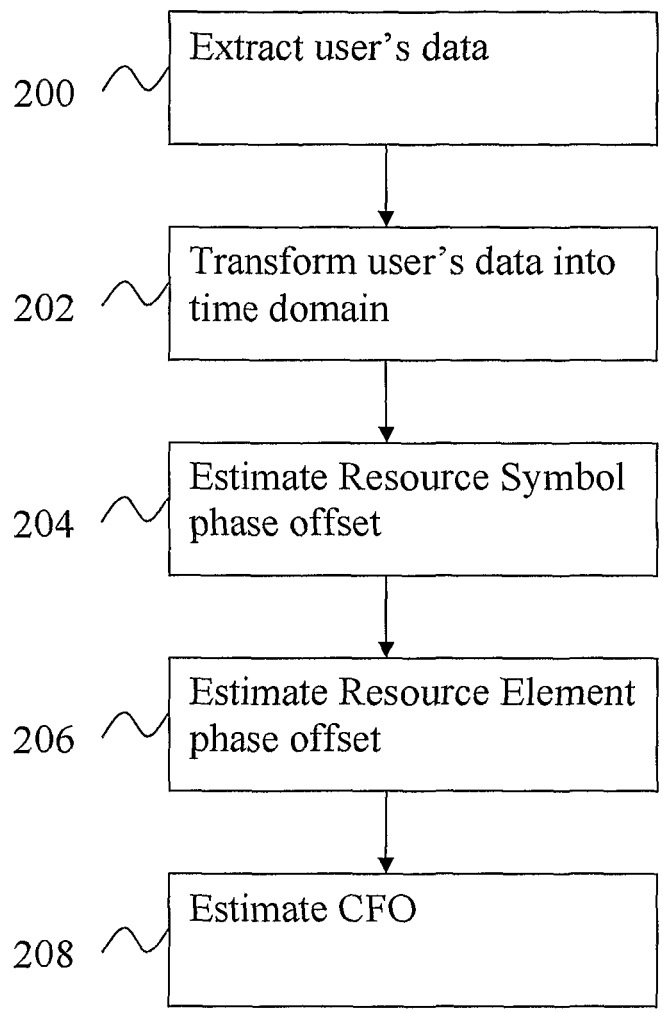
FIG. 2 shows a method for estimating a frequency offset, according to an embodiment.

With reference to FIG. 2, a method in a sending system entity for estimating a Carrier Frequency Offset (CFO), associated with a data transfer from a receiving system entity in a mobile communication network, will now be described in accordance with an embodiment.

In a first step 200, user data for a predefined user i is extracted from the data received from a set of receiving system entities, communicating with the sending system entity. This is typically achieved by performing a sub-carrier demapping on the received data in the frequency domain. In a following step 202, the extracted data for the user i is transformed into a time domain. An Inverse Discrete Fourier Transform (IDFT), e.g. Inverse Fast Fourier Transform (IFFT) applied for the transformation. An example of extracted user data in the time domain for a user i is further shown in FIG. 3.

A resource symbol phase offset is estimated in a subsequent step 204. An example of the determination of the resource symbol phase offset is described in an embodiment below. A resource element phase offset is estimated in another step 206. Also an example of the determination of the resource element phase offset is described in an embodiment below. In a final step 208, the CFO is estimated. The estimation of the CFO is based on the resource symbol phase offset $\theta_1$ and the resource element phase offset $\theta_2$, and is described in more detail in an embodiment below.

In an alternative embodiment, based on the embodiment above, the sending system entity may use the estimated CFO as a basis for a compensation of its settings associated with carrier frequencies. Moreover, the sending system may also send the estimated CFO to the receiving system entity, to be used for its settings associated with carrier frequencies.

Figure 3:
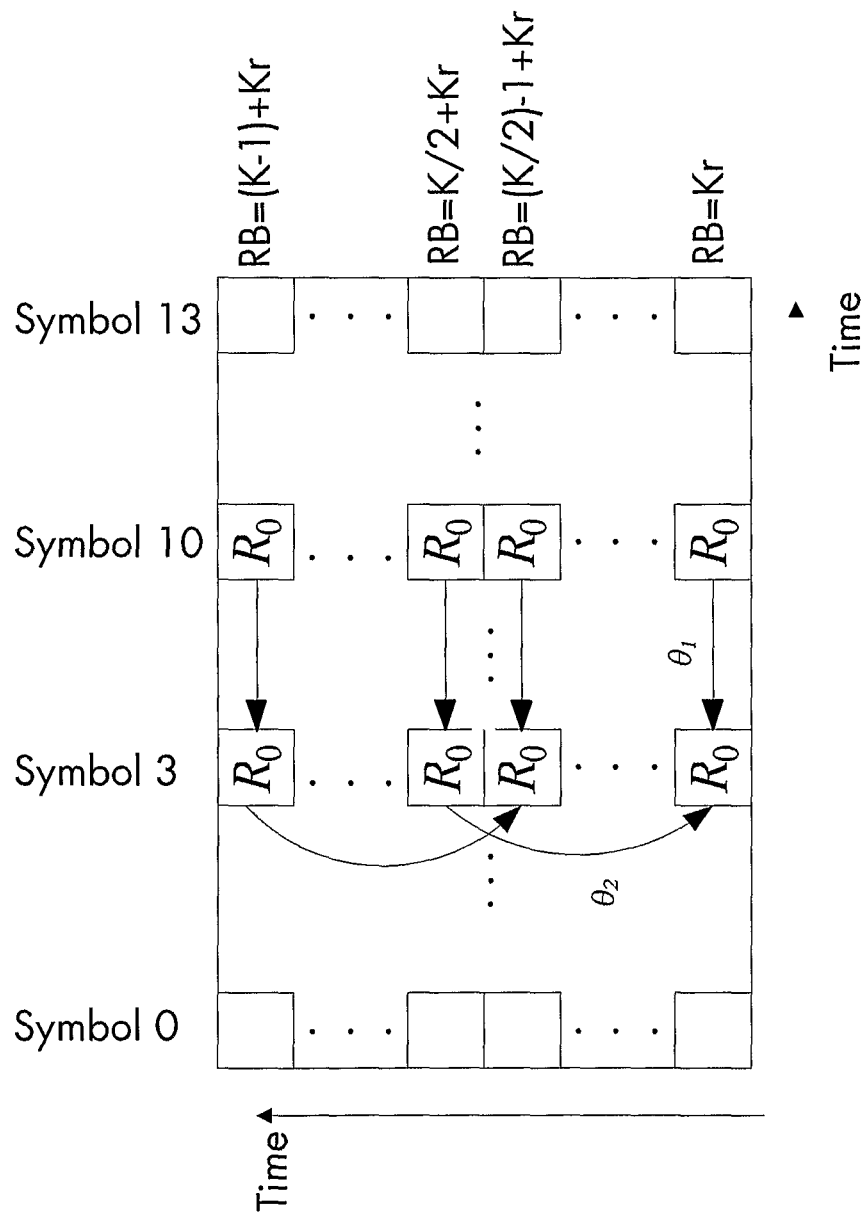
FIG. 3 shows a method for estimating a frequency offset, according to another embodiment.

With reference to FIG. 3, schematically illustrating the structure of user date for a user i, a method for determining a resource symbol phase offset $\theta_1$ and a resource element phase offset $\theta_2$, in accordance with an embodiment will now be described.

The resource symbol phase offset $\theta_1$ is determined by calculating a cross-correlation between two received resource symbols associated with the same resource block. In this embodiment the reference symbols 3 and 10 are used for the calculation. The resource signals of the resource symbols are typically affected by White Gaussian Noise, when being received by the sending system entity. In order to reduce the noise, a cross-correlation for the received reference signals of the reference symbols is calculated for each resource element of the resource block, before the cross-correlations are summarised, i.e. 12 cross-correlations are summarised. Finally, the resource symbol phase offset $\theta_1$ is estimated as the angle part of the summarised cross-correlations. To reduce the noise further, the cross-correlations for more than one resource block may be calculated and used when estimating the resource symbol phase offset $\theta_1$. The resource symbol phase offset $\theta_1$ can then be estimated as:

$$\theta_1 \approx \text{angle}\left\{\sum_{k=K_r*12}^{(K-1+K_r)*12} [r^i[k, 3+7](R_0[k, 3+7])^*][r^i[k, 3](R_0[k, 3])^*]^*\right\}, \quad (1)$$

where $r^i[k,3+7](R_0[k,3+7])$ is the received signal of the resource symbol 10, and $r^i[k,3](R_0[k,3])$ is the received signal of the resource symbol 3 for the user i. $R_0$ is the sent reference signal. User i occupies K resource blocks from k=Kr to k=(K−1)+Kr.

The resource element phase offset $\theta_2$ is determined by calculating a cross-correlation between the two corresponding resource symbols, in different resource blocks. In this embodiment the reference symbols 3 for resource block Kr and K/2+Kr are used for the calculation, where the user i occupies K resource blocks from Kr to (K−1)+Kr. As described above, the resource signals of the resource symbols are typically affected by White Gaussian Noise, when being received by the sending system entity. In order to reduce the noise, a cross-correlation for the received reference signals is calculated for each pair of resource elements of the resource blocks, before the cross-correlations are summarised, i.e. 12 cross-correlations are summarised. Finally, the resource element phase offset $\theta_2$ is estimated as the angle part of the summarised cross-correlations. To reduce the noise further, the cross-correlations for more than one resource block may be calculated and used when estimating the resource symbol phase offset $\theta_2$. The resource symbol phase offset $\theta_2$ can then be estimated as:

$$\theta_2 \approx \text{angle} \left\{ \sum_{k=K_r*12}^{(K/2+K_r)*12} [r^i[k, 3](R_0[k, 3])^*][r^i[k + (K/2)*12, 3](R_0[k + (K/2)*12, 3])^*]^* \right\}, \quad (2)$$

where $r^i[k,3](R_0[k,3])$ is the received signal of the resource symbol 3 of the resource block k, and $[r^i[k+(K/2)*12,3](R_0[k+(K/2)*12,3])$ is the received signal of the resource symbol 3 of the resource block k+(K/2) for the user i. $R_0$ is the sent reference signal. User i occupies K resource blocks from k=Kr to k=(K−1)+Kr.

It is to be noted that the invention is not limited to the use of the described reference symbols and resource blocks. A skilled person is free to select other suitable resource symbols and/or resource blocks within the inventive concept. For instance, when the resource element phase offset $\theta_2$ is estimated, the reference symbol 10 may be used, or two other suitable resource blocks. Moreover, in the case where an odd number of resource blocks are occupied by the user i, the skilled person realizes how to modify the method by selecting suitable resource elements to use for the calculation of the cross-correlations.

Furthermore, even if cross-correlations are calculated for all 12 resource elements in the equations above, the skilled person is not limited to that. He/she may select another suitable number of resource elements as a basis for the calculations.

Moreover, both the resource symbol phase offset $\theta_1$ and the resource element phase offset $\theta_2$ are related to the CFO. $\theta_1$ is the phase offset between two corresponding REs in two reference symbols, respectively, which is caused by $\epsilon_i$. That means $\theta_1 = 2\pi\epsilon_i*7.5$.

$\theta_2$ is the phase offset between the first half corresponding RE and the second half corresponding RE in one reference symbol, respectively. That means $\theta_2 = 2\pi\epsilon_i\, 6K/(12K)$. The normalised CFO compared to the bandwidth of the resource elements is denoted $\epsilon i$ and $\theta_1 = 15\pi\epsilon_i$ and $\theta_2 = \pi\epsilon_i$. Therefore, any one of $\theta_1$ or $\theta_2$ can be used for estimating the CFO. However, the estimation range is too small when using only $\theta_1$ for estimating the CFO, and the accuracy is not good enough when using only $\theta_2$. Combining the equations (1) and (2) gives that $$15\,\theta_2 = \theta_1 + 2\pi M \quad (3),$$

where M is an integer.

Since the integer M is related to $\theta_1$ and $\theta_2$ and the accuracy of estimating $\theta_1$ is better than the accuracy of estimating $\theta_2$, $\epsilon_i$ could be estimated as $$\epsilon_i \approx (\theta_1 + 2\pi\hat{M})/15\pi \quad (4),$$

where $\hat{M} = \lfloor (15\theta_2 - \theta_1)/2\pi \rfloor$. (5)

Thus, using a combination of the resource symbol phase offset and the resource element phase offset achieves the CFO to be estimated more accurately and with a wider range.

Figure 4:
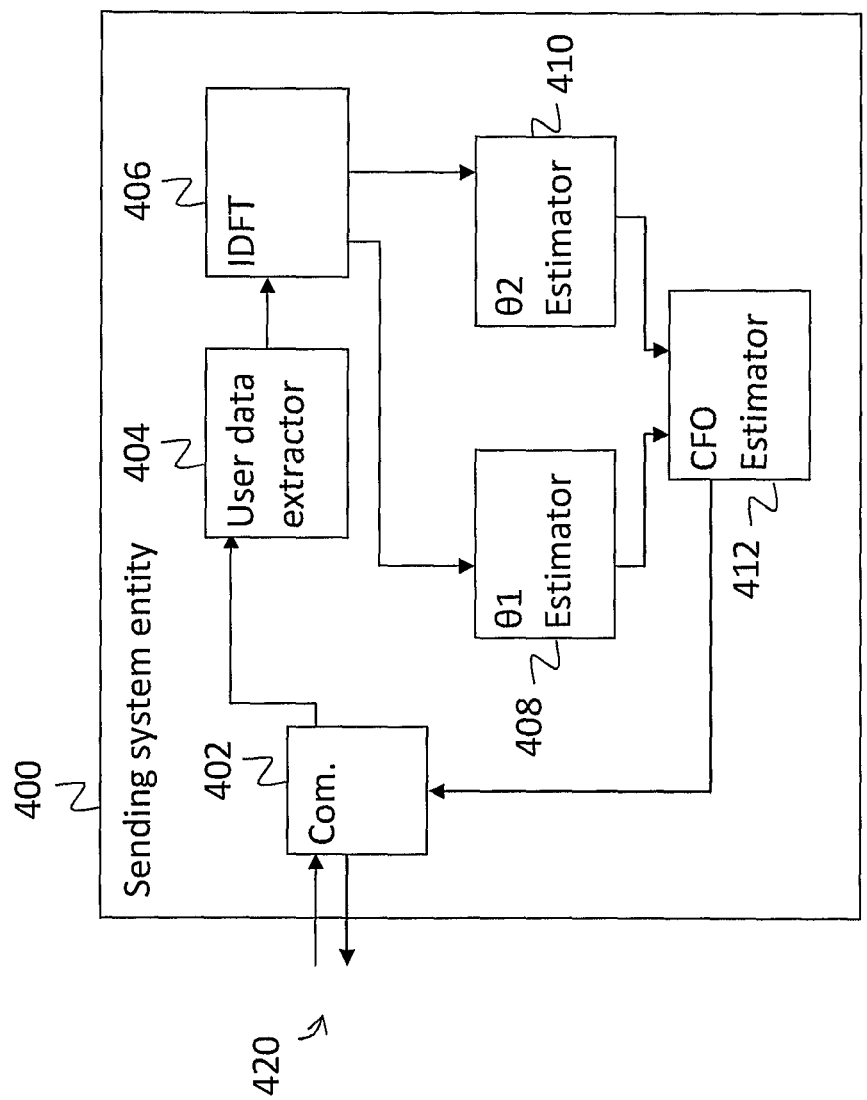
FIG. 4 shows a sending system entity, according to a further embodiment.

With reference to FIG. 4, a receiving system 400 entity adapted to determine a CFO, in accordance with an embodiment will now be described. The receiving system entity 400 comprises a communication unit 402, a user data extracting unit 404, a transformation unit 406, a resource symbol phase offset estimator 408, a resource element phase offset estimator 410, and a Carrier Frequency Offset estimator 412. The sending system entity 400 may typically be a radio base station, a NodeB, an eNodeB, an access point, or a relay station.

The communication unit 402 is adapted to receive data transferred from one or more receiving system entities on a communication link 420. The receiving system entities may typically be, Mobile Terminals or User Equipments. The user data extracting unit 404 is adapted to extract the data associated with a predefined user from the data received by the communication unit 402. Typically, the data received by the sending system entity 400 is provided with a cyclic prefix (CP), which has to be removed. Furthermore, the received data is typically transferred into the frequency domain before the data of the predefined user i is extracted. The skilled person realises how to implement the CP removal and the transformation of transferred data into the frequency domain in any of the communication unit 402 and the data extracting unit 404. Moreover, he/she understands how to extract the user data for the predefined user and therefore such extraction will not be further discussed.

The transformation unit 406 is adapted to transform the user data of the user i into the time domain. Typically, this is performed by using an Inverse Discrete Fourier Transform (IDFT), as Inverse Fast Fourier Transform (IFFT) on the user data. The resource symbol phase offset estimator 408 is adapted to determine a resource symbol phase offset $\theta_i$ for the extracted data of the user i, and the resource element phase offset estimator 410 is adapted to estimate a resource element phase offset $\theta_2$ for the extracted data of user i. How the resource symbol phase offset $\theta_1$ and the resource element phase offset $\theta_2$ are determined is described in an embodiment above, and will not be further discussed herein.

The carrier frequency offset estimator 412 is adapted to estimate the CFO based on the resource symbol phase offset $\theta_1$ and the resource element phase offset $\theta_2$. Also the estimation of the CFO is described in an embodiment above and is therefore not further described.

In an alternative embodiment, based on the one above, the receiving system entity 400 may further comprise a mechanism (not shown in the figure) which is able to compensate for the CFO. It may further be adapted to communicate the estimated CFO to the receiving system entity via the communication link 420, to be used as a basis for adjustment of settings associated with carrier frequencies in the receiving system entity.

Even if the receiving system entity according to the embodiments above is adapted to determine the CFO, it will easily be modified to be able to determine other frequency offsets, which is realised by a skilled person. Such frequency offsets might be Doppler Frequency Offsets, or Timing Error Frequency Offsets, Multi-user Frequency offsets, etc.

Furthermore, it is to be understood that the sending system entity described above in this description also comprises additional conventional means providing functionality, such as e.g. various control units and memories, necessary for enabling common functions and features to operate properly. However, for simplicity reasons, any means or functionality which is not necessary for the understanding of the proposed estimating of the frequency offset has been omitted in the figures, and will not be discussed in any further detail in this description.

While the invention has been described with reference to specific exemplary embodiments, the description is in general only intended to illustrate how the invention can be used and should not be taken as limiting the scope of the invention. Although the concepts of LTE and HSPA have been used throughout when describing the above embodiments, any other similar or equivalent standards and network elements for mobile communication may basically be used in the manner described. The invention is generally defined by the following independent claims.

ABBREVIATIONS

DFT-SFDMA Discrete Fourier Transform-Spread Frequency Division Mutiple_Access
LTE Long Term Evolution
RS Reference Signal
PAPR Peak-to-Average-Power-Ratio
CFO Carrier Frequency Offset
FO Frequency Offset
FFT Fast Fourier Transform
IFFT Inverse Fast Fourier Transform
RB Resource Block
RE Resource Element

The invention claimed is:

1. A method in a sending system entity for estimating a frequency offset, associated with a data transfer from a receiving system entity in a mobile communication network, the method comprising:
    extracting user data associated with a predefined user from the transferred data;
    transforming the extracted user data into a time domain;
    estimating a resource symbol phase offset, $\theta_1$, between two resource symbols representing the same user among the transformed user data;
    estimating a resource element phase offset, $\theta_2$, between two resource blocks occupied by the same user among the transformed user data;
    estimating a frequency offset based on $\theta_1$ and $\theta_2$; and
    using the estimated frequency offset to perform frequency compensation on a plurality of carrier frequencies used for communication by the sending system entity,
    wherein the two resource symbols are reference symbols, and estimating the resource symbol phase offset comprises calculating the sum of one or more cross-correlations between two reference signals associated with the same resource element.

2. The method according to claim 1, wherein twelve (12) cross-correlations are calculated and summarised, the resource element being associated with the same resource block.

3. The method according to claim 1, wherein estimating $\theta_2$ comprises calculating the phase offset between two resource blocks occupied by the same user.

4. The method according to claim 3, wherein the time distance between the resource blocks is half the length of the sum of the resource blocks which the user occupies.

5. The method according to claim 3, wherein estimating the resource element offset comprises calculating the sum of one or more cross-correlations between two reference signals, the reference signals being associated with corresponding resource elements of the resource blocks.

6. The method according to claim 5, wherein twelve (12) cross-correlations are calculated and summarised.

7. The method according to claim 1, wherein the frequency offset comprises: a Carrier Frequency Offset, a Doppler Frequency Offset, or a Timing Error Frequency Offset.

8. The method according to claim 1, wherein extracting user data comprises at least one of: removing a cyclic prefix from the transferred data and transforming the transferred data into a frequency domain.

9. The method according to claim 1, wherein the transformation is performed by using an Inverse Discrete Fourier Transform.

10. A radio apparatus adapted to estimate a frequency offset associated with a data transfer from a receiving system entity in a mobile communication network, comprising:
    at least one processor coupled to memory and configured to:
        receive data;
        extract user data associated with a predefined user from the received data;
        transform the extracted data from a frequency domain into a time domain;
        determine a resource symbol phase offset, $\theta_1$, between two resource symbols representing the same user among the transformed data;
        determine a resource element phase offset, $\theta_2$, between two resource blocks occupied by the same user among the transformed user data;
        determine the frequency offset based on the resource symbol phase offset, $\theta_1$, and the resource symbol phase offset, $\theta_2$, and
        use the estimated frequency offset to perform frequency compensation on a plurality of carrier frequencies used for communication by the sending system entity,
    wherein the two resource symbols are reference symbols, and estimating the resource symbol phase offset comprises calculating the sum of one or more cross-correlations between two reference signals associated with the same resource element.

11. The apparatus according to claim 10, wherein the apparatus comprises a radio base station, a NodeB, an eNodeB, an access point, or a relay station.

12. The apparatus according to claim 10, wherein the at least one processor is adapted to estimate $\theta_2$ by-calculating the phase offset between two resource blocks occupied by the same user.

13. The apparatus according to claim 12, wherein the time distance between the resource blocks is half the length of the sum of the resource blocks which the user occupies.

14. The apparatus according to claim 12, wherein the at least one processor is adapted to estimate the resource element offset by calculating the sum of one or more cross-correlations between two reference signals, the reference signals being associated with corresponding resource elements of the resource blocks.

15. The apparatus according to claim 14, wherein the at least one processor is adapted to calculate and summarise twelve (12) cross-correlations.

16. The apparatus according to claim 10, wherein the frequency offset comprises: a Carrier Frequency Offset, a Doppler Frequency Offset, or a Timing Error Frequency Offset.

17. The apparatus according to claim 10, wherein the at least one processor is adapted to extract user data by at least one of: removing a cyclic prefix from the transferred data and transforming the transferred data into a frequency domain.

18. The apparatus according to claim 10, wherein the at least one processor is adapted to transform the extracted data using an Inverse Discrete Fourier Transform.

* * * * *

UNITED STATES PATENT AND TRADEMARK OFFICE
CERTIFICATE OF CORRECTION

| | | |
|---|---|---|
| PATENT NO. | : 9,148,265 B2 | Page 1 of 1 |
| APPLICATION NO. | : 13/645644 | |
| DATED | : September 29, 2015 | |
| INVENTOR(S) | : Ma | |

It is certified that error appears in the above-identified patent and that said Letters Patent is hereby corrected as shown below:

In the specification,

In Column 5, Line 54, in Equation (5), delete "$[15\theta_2-\theta_1)$" and insert -- $[(15\theta_2-\theta_1)$ --, therefor.

Signed and Sealed this
First Day of March, 2016

Michelle K. Lee
*Director of the United States Patent and Trademark Office*